United States Patent
Hommi et al.

(10) Patent No.: US 7,377,349 B2
(45) Date of Patent: May 27, 2008

(54) SLIP CONTROL DEVICE FOR VEHICLE, VEHICLE MOUNTED WITH THE DEVICE, AND THE METHOD OF CONTROLLING VEHICLE SLIP

(75) Inventors: Akira Hommi, Aichi-ken (JP); Kiyotaka Hamajima, Okazaki (JP); Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 302 days.

(21) Appl. No.: 10/528,217

(22) PCT Filed: Jul. 7, 2003

(86) PCT No.: PCT/JP03/08596

§ 371 (c)(1),
(2), (4) Date: Mar. 18, 2005

(87) PCT Pub. No.: WO2004/026617

PCT Pub. Date: Apr. 1, 2004

(65) Prior Publication Data

US 2005/0284679 A1  Dec. 29, 2005

(30) Foreign Application Priority Data

Sep. 20, 2002 (JP) ............................ 2002-275136

(51) Int. Cl.
*B60K 28/16* (2006.01)

(52) U.S. Cl. ........................... 180/197; 701/87; 701/90

(58) Field of Classification Search ............... 180/197; 318/52, 432; 701/87, 90
See application file for complete search history.

(56) References Cited

U.S. PATENT DOCUMENTS

| 4,035,698 A |   | 7/1977 | Soderberg |
| 5,050,940 A | * | 9/1991 | Bedford et al. ............. 303/166 |
| 5,195,037 A | * | 3/1993 | Tezuka ........................ 701/81 |

(Continued)

FOREIGN PATENT DOCUMENTS

EP      1147937 A    10/2001

(Continued)

OTHER PUBLICATIONS

Supplementary European Search Report for Appln. No. EP 03 74 1241 issued Jul. 21, 2006.

*Primary Examiner*—Lesley D. Morris
*Assistant Examiner*—Maurice Williams
(74) *Attorney, Agent, or Firm*—Kenyon & Kenyon LLP

(57) ABSTRACT

Under the condition of a large variation Tm in motor torque demand Tm*, the significant torque change may lead to some vibration of a vehicle to temporarily heighten an angular acceleration. The temporary rise of the angular acceleration may cause the angular acceleration to exceed a preset threshold value slip and result in misdetection of the occurrence of a 'phantom' skid in an angular acceleration—based skid state determination (step S112). The drive control of the invention accordingly specifies a potential for misdetection of the occurrence of a 'phantom' skid when the variation Tm in motor torque demand Tm* exceeds a preset threshold value Tthr at step S108. The drive control thereby does not execute skid occurring state control (step S120) with torque restriction but performs grip state control at step S116.

1 Claim, 12 Drawing Sheets

U.S. PATENT DOCUMENTS

| | | | |
|---|---|---|---|
| 5,511,866 A * | 4/1996 | Terada et al. | 303/152 |
| 5,677,610 A * | 10/1997 | Tanamachi et al. | 318/801 |
| 6,473,683 B1 * | 10/2002 | Nada | 701/82 |
| 2001/0032046 A1 | 10/2001 | Nada | |

FOREIGN PATENT DOCUMENTS

| | | |
|---|---|---|
| JP | 02-119643 | 5/1990 |
| JP | 03-156135 | 7/1991 |
| JP | 06-330778 | 11/1994 |
| JP | 07-321085 | 11/1994 |
| JP | 07-264712 | 10/1995 |
| JP | 07-315195 | 12/1995 |
| JP | 08-182119 A | 7/1996 |
| JP | 10-304514 | 11/1998 |

* cited by examiner (a) Time Points t7 to t9

(c) Time Points t14 to t17

(b) Time Points t10 to t13

(d) Time Points t18 to t22

SLIP CONTROL DEVICE FOR VEHICLE, VEHICLE MOUNTED WITH THE DEVICE, AND THE METHOD OF CONTROLLING VEHICLE SLIP

This is a 371 national phase application of PCT/JP2003/008596 filed 7 Jul. 2003, claiming priority to Japanese Patent Application No. 2002-275136 filed 20 Sep. 2002, the contents of which are incorporated herein by reference.

TECHNICAL FIELD

The present invention relates to a vehicle skid control device, an automobile with the device, and a corresponding method. Specifically, the invention relates to a vehicle skid control device, an automobile with the vehicle skid control device mounted thereon, and a vehicle skid control method.

BACKGROUND ART

One proposed vehicle skid control device restricts the torque level output from a motor to drive wheels on the occasion of the occurrence of a skid of the drive wheels caused by the torque output from the motor (see, for example, Japanese Patent Laid-Open Gazette No. 10-304514). This proposed device detects the occurrence of a skid according to an increase in angular acceleration of the drive wheels over a preset threshold value and lowers the torque level output from the motor in response to detection of the occurrence of a skid, so as to reduce the skid. The angular acceleration of the drive wheels may, however, exceed the preset threshold value, due to another cause, for example, some vibration of the vehicle at a start of an engine or due to a significant torque change. This may result in misdetection of a 'phantom' skid, which actually does not exist.

There is another proposed technique that sets a significantly large value to the threshold value representing the occurrence of a skid of the drive wheels under the condition of an abrupt increase in accelerator opening or a significant time variation of the accelerator opening and thereby eliminates effectiveness of the skid control (see, for example, Japanese Patent Laid-Open Gazette No. 3-156135). This proposed technique, however, aims to keep the sufficient response of the vehicle body in the event of an abrupt increase in accelerator opening and does not give any consideration to unnecessary restriction of the driving torque in response to misdetection of a 'phantom' skid.

In order to eliminate the drawbacks of the prior art discussed above, the object of the invention is to provide a vehicle skid control device and a corresponding vehicle skid control method that prevent unnecessary restriction of driving torque in response to misdetection of a 'phantom' skid, which actually does not exist, in angular acceleration-based skid state determination.

DISCLOSURE OF THE INVENTION

In order to attain at least part of the above and the other related objects, the invention provides vehicle skid control devices and corresponding vehicle skid control methods having configurations discussed below.

One application of the invention is a vehicle skid control device of controlling a power system that outputs power to a drive shaft linked to drive wheels of a vehicle. The vehicle skid control device of this application includes: an angular acceleration measurement module that measures an angular acceleration of the drive shaft; a skid detection module that detects occurrence of a skid of the drive wheels according to a variation in angular acceleration measured by the angular acceleration measurement module; a torque restriction module that, in response to detection of the occurrence of a skid by the skid detection module, restricts a driving torque of the drive wheels to reduce the skid; a state determination module that determines whether a current vehicle driving state causes a variation in angular acceleration with no occurrence of a skid; and a torque restriction prohibition module that prohibits the torque restriction module from restricting the driving torque of the drive wheels, when the state determination module determines that the current vehicle driving state causes the variation in angular acceleration with no occurrence of a skid.

In response to detection of the occurrence of a skid of the drive wheels according to a variation in angular acceleration of the drive shaft linked to the drive wheels, the vehicle skid control device of the invention having the above configuration restricts the driving torque of the drive wheels to reduce the skid. In the vehicle driving state that causes a variation in angular acceleration with no occurrence of a skid, however, a 'phantom' skid of the drive wheels, which actually does not exist, may be detected mistakenly according to the variation in angular acceleration, which is actually triggered by another cause. In this state, the restriction of the driving torque of the drive wheels is accordingly prohibited. This arrangement effectively prevents unnecessary restriction of the driving torque in response to misdetection of a 'phantom' skid in angular acceleration-based skid state determination.

Here the terminology 'power system' is not restrictive but may represent any device that is capable of outputting power to the drive shaft. The power system may be, for example, a motor, an engine, or both a motor and an engine. In a vehicle equipped with multiple 'power systems', the vehicle skid control device of the invention may be designed to control at least one of the multiple power systems. For example, in a vehicle equipped with both a motor and an engine as power systems, the vehicle skid control device of the invention may be designed to control at least the motor. Examples of 'the vehicle driving state that causes a variation in angular acceleration with no occurrence of a skid' include a state having a significant torque change and a starting time of an engine.

Another application of the invention is a vehicle skid control device of controlling a power system that outputs power to a drive shaft linked to drive wheels of a vehicle. The vehicle skid control device of this application includes: an angular acceleration measurement module that measures an angular acceleration of the drive shaft; a skid detection module that detects occurrence of a skid of the drive wheels according to a variation in measured angular acceleration; a torque restriction module that, in response to detection of the occurrence of a skid by the skid detection module, restricts a driving torque of the drive wheels to reduce the skid; a torque variation detection module that determines whether a variation in torque command value of the drive wheels caused by a driver's accelerator operation is within a preset range; and a torque restriction prohibition module that prohibits the torque restriction module from restricting the driving torque of the drive wheels, when the torque variation detection module determines that the variation in torque command value is out of the preset range.

In response to detection of the occurrence of a skid of the drive wheels according to a variation in angular acceleration of the drive shaft linked to the drive wheels, the vehicle skid control device of the invention having the above configuration restricts the driving torque of the drive wheels to reduce the skid. When the variation in torque command value of the drive wheels caused by the driver's accelerator operation is out of the preset range (for example, greater than a preset level), such a large torque change may cause some vibration of the vehicle and significantly vary the angular acceleration. In this state, a 'phantom' skid of the drive wheels may be detected mistakenly according to the variation in angular acceleration, which is actually triggered by the torque change-induced vibration of the vehicle. The restriction of the driving torque of the drive wheels is accordingly prohibited. This arrangement effectively prevents unnecessary restriction of the driving torque in response to misdetection of a 'phantom' skid in angular acceleration-based skid state determination.

Sill another application of the invention is a vehicle skid control device of controlling at least one of an engine and a motor of a power system that outputs power to a drive shaft linked to drive wheels of a vehicle. The vehicle skid control device of this application includes: an angular acceleration measurement module that measures an angular acceleration of the drive shaft; a skid detection module that detects occurrence of a skid of the drive wheels according to a variation in measured angular acceleration; a torque restriction module that, in response to detection of the occurrence of a skid by the skid detection module, restricts a driving torque of the drive wheels to reduce the skid; an engine vibration detection module that detects a vibration at a start of the engine; and a torque restriction prohibition module that prohibits the torque restriction module from restricting the driving torque of the drive wheels, in response to detection of the vibration at the start of the engine by the engine vibration detection module.

In response to detection of the occurrence of a skid of the drive wheels according to a variation in angular acceleration of the drive shaft linked to the drive wheels, the vehicle skid control device of the invention having the above configuration restricts the driving torque of the drive wheels to reduce the skid. Some vibration of the vehicle at the start of the engine may significantly vary the angular acceleration. In this state, a 'phantom' skid of the drive wheels may be detected mistakenly according to the variation in angular acceleration, which is actually triggered by the vibration of the vehicle at the start of the engine. The restriction of the driving torque of the drive wheels is accordingly prohibited. This arrangement effectively prevents unnecessary restriction of the driving torque in response to misdetection of a 'phantom' skid in angular acceleration-based skid state determination.

Another application of the invention is a vehicle skid control device of controlling a power system that outputs power to a drive shaft linked to drive wheels of a vehicle. The vehicle skid control device of this application includes: an angular acceleration measurement module that measures an angular acceleration of the drive shaft; a skid detection module that detects occurrence of a skid of the drive wheels when the measured angular acceleration increases over a preset threshold value; a torque restriction module that, in response to detection of the occurrence of a skid by the skid detection module, restricts a driving torque of the drive wheels to reduce the skid; a time variation attribution module that determines whether a time variation in angular acceleration, which is measured by the angular acceleration measurement module, after the increase over the preset threshold value is attributable to mechanical resonance; and a torque restriction prohibition module that prohibits the torque restriction module from restricting the driving torque of the drive wheels, when the time variation attribution module determines that the time variation in angular acceleration after the increase over the preset threshold value is attributable to the mechanical resonance.

In response to detection of the occurrence of a skid of the drive wheels corresponding to an increase in angular acceleration of the drive shaft linked to the drive wheels over the preset threshold value, the vehicle skid control device of the invention having the above configuration restricts the driving torque of the drive wheels to reduce the skid. The time variation in angular acceleration after the increase over the preset threshold value may, however, be ascribed to the mechanical resonance. In this state, a 'phantom' skid of the drive wheels may be detected mistakenly according to the variation in angular acceleration, which is actually triggered by the mechanical resonance. The restriction of the driving torque of the drive wheels is accordingly prohibited. This arrangement effectively prevents unnecessary restriction of the driving torque in response to misdetection of a 'phantom' skid in angular acceleration-based skid state determination.

It is preferable that the time variation attribution module determines whether a time width between the increase in angular acceleration crossing over the preset threshold value and a start of a decreasing tendency of the angular acceleration is attributable to the mechanical resonance. Prohibition of the torque restriction is effected only after completion of the determination whether the time variation in angular acceleration after the increase over the preset threshold value is attributable to the mechanical resonance. The attribution to the mechanical resonance based on the time width between the increase in angular acceleration over the preset threshold value and the start of the decreasing tendency of the angular acceleration desirably ensures prompt determination.

In one preferable embodiment of any of the vehicle skid control devices of the invention described above, the skid detection module detects the occurrence of a skid when the angular acceleration measured by the angular acceleration measurement module increases over a preset threshold value. This arrangement ensures easy and accurate detection of the occurrence of a skid. It is also preferable that the torque restriction prohibition module does not prohibit the torque restriction module from restricting the driving torque of the drive wheels, when the angular acceleration measured by the angular acceleration measurement module exceeds a non-skid upper limit, which is set to be significantly larger than the preset threshold value. This arrangement prevents restriction of the driving torque of the drive wheels from being wrongly prohibited in the occurrence of a skid. The non-skid upper limit is set to, for example, a value that is found only in the event of a skid.

In another preferable embodiment of any of the vehicle skid control device of the invention described above, the torque restriction prohibition module suspends the function of the torque restriction module or sets an unexpectedly large value to the threshold value adopted in the skid detection module, so as to eliminate effectiveness of the torque restriction module and accordingly interfere with the restriction of the driving torque of the drive wheels by the torque restriction module. The restriction of the driving torque of the drive wheels is prohibited by either way.

In still another preferable embodiment of any one of the vehicle skid control device of the invention described above, the torque restriction prohibition module prohibits the torque restriction module from restricting the driving torque of the drive wheels for a predetermined restriction prohibition time. This arrangement effectively controls a skid which occurs after the predetermined prohibition time has expired.

Another application of the invention is an automobile with any of the vehicle skid control device of the invention discussed above mounted thereon. The automobile with the vehicle control device of the invention achieves the equivalent effects to those of the vehicle control device. For example, the automobile of the invention effectively prevents unnecessary restriction of the driving torque in response to misdetection of a 'phantom' skid in angular acceleration-based skid state determination.

Another application of the invention is a vehicle skid control method of controlling a power system that outputs power to a drive shaft linked to drive wheels of a vehicle. The vehicle skid control method including the steps of: (a) measuring an angular acceleration of the drive shaft; (b) detecting occurrence of a skid of the drive wheels according to a variation in measured angular acceleration; (c) in response to detection of the occurrence of a skid by the step (b) restricting a driving torque of the drive wheels to reduce the skid; (d) determining whether a current vehicle driving state causes a variation in angular acceleration with no occurrence of a skid; and (e) prohibiting restriction of the driving torque of the drive wheels by the step(c), when the step (d) determines that the current vehicle driving state causes the variation in angular acceleration with no occurrence of a skid.

In response to detection of the occurrence of a skid of the drive wheels according to a variation in angular acceleration of the drive shaft linked to the drive wheels, the vehicle skid control method of the invention having the above configuration restricts the driving torque of the drive wheels to reduce the skid. In the vehicle driving state that causes a variation in angular acceleration with no occurrence of a skid, however, a 'phantom' skid of the drive wheels, which actually does not exist, may be detected mistakenly according to the variation in angular acceleration, which is actually triggered by another cause. In this state, the restriction of the driving torque of the drive wheels is accordingly prohibited. This arrangement effectively prevents unnecessary restriction of the driving torque in response to misdetection of a 'phantom' skid in angular acceleration-based skid state determination.

Another application of the invention is a vehicle skid control method of controlling a power system that outputs power to a drive shaft linked to drive wheels of a vehicle. The vehicle skid control method including the steps of: (a) measuring an angular acceleration of the drive shaft; (b) detecting occurrence of a skid of the drive wheels according to a variation in measured angular acceleration; (c) in response to detection of the occurrence of a skid by the step (b), restricting a driving torque of the drive wheels to reduce the skid; (d) determining whether a variation in torque command value of the drive wheels caused by a driver's accelerator operation is within a preset range; and (e) prohibiting restriction of the driving torque of the drive wheels by the step (c), when the step (d) determines that the variation in torque command value is out of the preset range.

When the variation in torque command value of the drive wheels caused by the driver's accelerator operation is out of the preset range (for example, greater than a preset level), such a large torque change may cause some vibration of the vehicle and significantly vary the angular acceleration. In this state, the vehicle skid control method of the invention having the above configuration prohibits the restriction of the driving torque of the drive wheels, while a 'phantom' skid of the drive wheels may be detected mistakenly according to the variation in angular acceleration, which is actually triggered by the torque change-induced vibration of the vehicle. This arrangement effectively prevents unnecessary restriction of the driving torque in response to misdetection of a 'phantom' skid in angular acceleration-based skid state determination.

Still another application of the invention is a vehicle skid control method of controlling at least one of an engine and a motor of a power system that outputs power to a drive shaft linked to drive wheels of a vehicle. The vehicle skid control method including the steps of: (a) measuring an angular acceleration of the drive shaft; (b) detecting occurrence of a skid of the drive wheels according to a variation in measured angular acceleration; (c) in response to detection of the occurrence of a skid by the step (b), restricting a driving torque of the drive wheels to reduce the skid; (d) detecting a vibration at a start of the engine; and (e) prohibiting restriction of the driving torque of the drive wheels by the step (c), in response to detection of the vibration at the start of the engine by the step (d).

Some vibration of the vehicle at the start of the engine may significantly vary the angular acceleration. In this state, the vehicle skid control method of the invention having the above configuration prohibits the restriction of the driving torque of the drive wheels, while a 'phantom' skid of the drive wheels may be detected mistakenly according to the variation in angular acceleration, which is actually triggered by the vibration of the vehicle at the start of the engine. The restriction of the driving torque of the drive wheels is accordingly prohibited. This arrangement effectively prevents unnecessary restriction of the driving torque in response to misdetection of a 'phantom' skid in angular acceleration-based skid state determination.

Still another application of the invention is a vehicle skid control method of controlling a power system that outputs power to a drive shaft linked to drive wheels of a vehicle. The vehicle skid control method including the steps of: (a) measuring an angular acceleration of the drive shaft; (b) detecting occurrence of a skid of the drive wheels when the measured angular acceleration increases over a preset threshold value; (c) in response to detection of the occurrence of a skid by the step (b), restricting a driving torque of the drive wheels to reduce the skid; (d) determining whether a time variation in the measured angular acceleration after the increase over the preset threshold value is attributable to mechanical resonance; and (e) prohibiting restriction of the driving torque of the drive wheels by the step (c), when the step (d) determines that the time variation in angular acceleration after the increase over the preset threshold value is attributable to the mechanical resonance.

The vehicle skid control method having the above configuration prohibits the restriction of the driving torque of the drive wheels, while the time variation in angular acceleration after the increase over the preset threshold value is determined to be ascribed to the mechanical resonance, even when a 'phantom' skid of the drive wheels may be detected mistakenly according to the variation in angular acceleration, which is actually triggered by the mechanical resonance. This arrangement effectively prevents unnecessary restriction of the driving torque in response to misdetection of a 'phantom' skid in angular acceleration-based skid state determination.

FIRST EMBODIMENT

Figure 1:
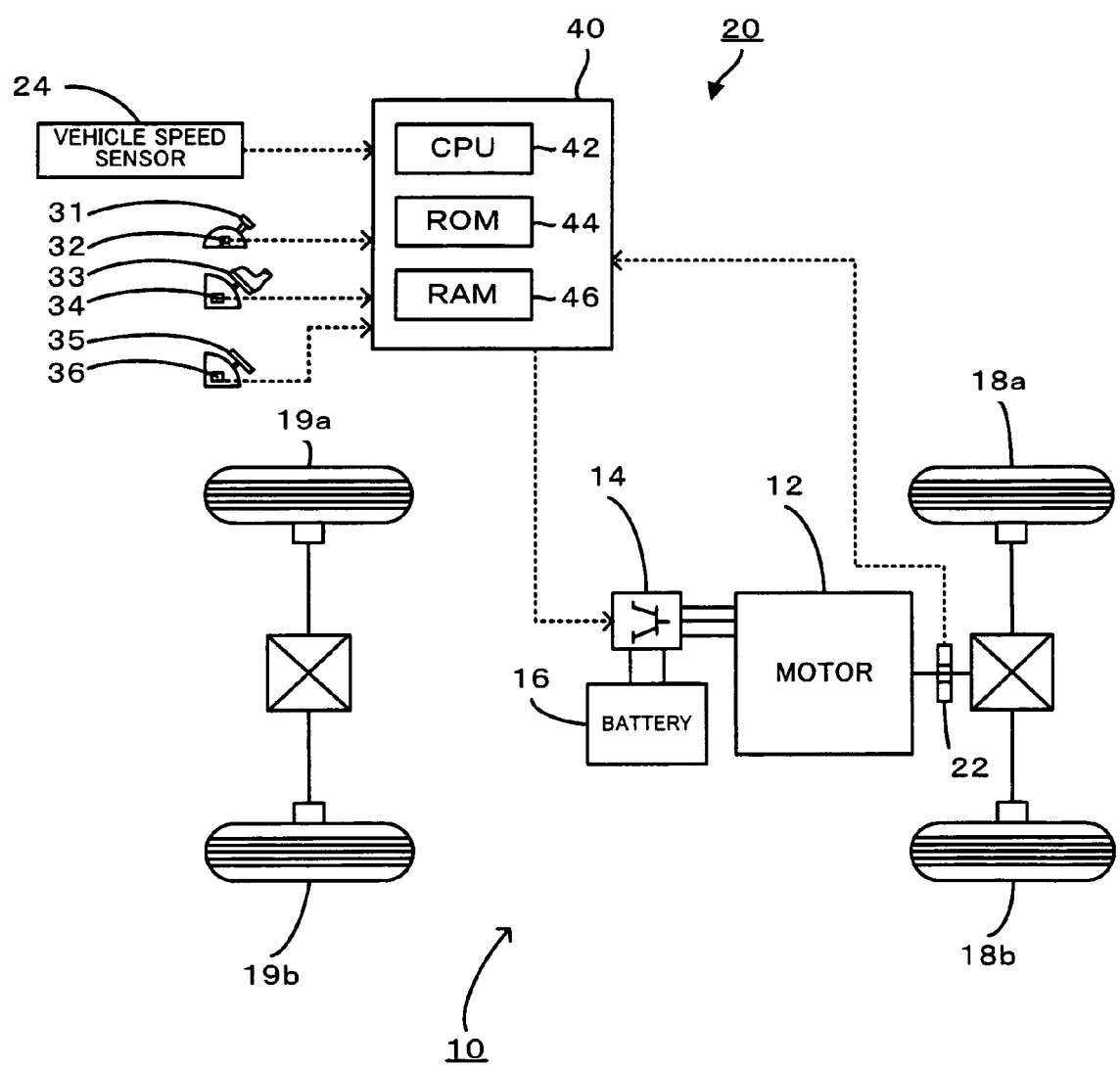
FIG. 1 schematically illustrates the configuration an electric vehicle.

FIG. 1 schematically illustrates the configuration an electric vehicle 10 equipped with an electronic control unit 40 that functions as a skid control device in one embodiment of the invention. As illustrated, in the electric vehicle 10, a motor 12 is driven with electric power supplied from a battery 16 via an inverter circuit 14 and outputs power to a drive shaft linked to drive wheels 18a, 18b. The electric vehicle 10 includes a rotation angle sensor 22 that measures a rotation angle θ of a rotating shaft of the motor 12, a vehicle speed sensor 24 that measures a driving speed of the electric vehicle 10 as a vehicle speed V, diversity of sensors that detect the driver's various operations (for example, a gearshift position sensor 32 that detects the driver' setting position of a gearshift lever 31, an accelerator pedal position sensor 34 that detects the driver's step-on amount of an accelerator pedal 33 (an accelerator opening Acc), and a brake pedal position sensor 36 that detects the driver's step-on amount of a brake pedal 35 (a brake opening)), and the electronic control unit 40 that controls the respective constituents of the system. The electric vehicle 10 also has driven wheels 19a and 19b.

The motor 12 is, for example, a known synchronous motor generator that functions as both a motor and a generator. The inverter circuit 14 includes multiple switching elements that convert a supply of electric power from the battery 16 into another form of electric power suitable for actuation of the motor 12. The structures of the motor 12 and the inverter circuit 14 are well known in the art and are not the key part of this invention, thus not being described here in detail.

The electronic control unit 40 is constructed as a microprocessor including a CPU 42, a ROM 44 that stores processing programs, a RAM 46 that temporarily stores data, and input and output ports (not shown). The electronic control unit 40 receives, via the input port, the rotation angle θ of the rotating shaft of the motor 12 measured by the rotation angle sensor 22, the vehicle speed V measured by the vehicle speed sensor 24, the gearshift position detected by the gearshift position sensor 32, the accelerator opening Acc detected by the accelerator pedal position sensor 34, and the brake opening detected by the brake pedal position sensor 36. The electronic control unit 40 outputs control signals, for example, switching control signals to the switching elements of the inverter circuit 14 to drive and control the motor 12, via the output port.

Figure 2:
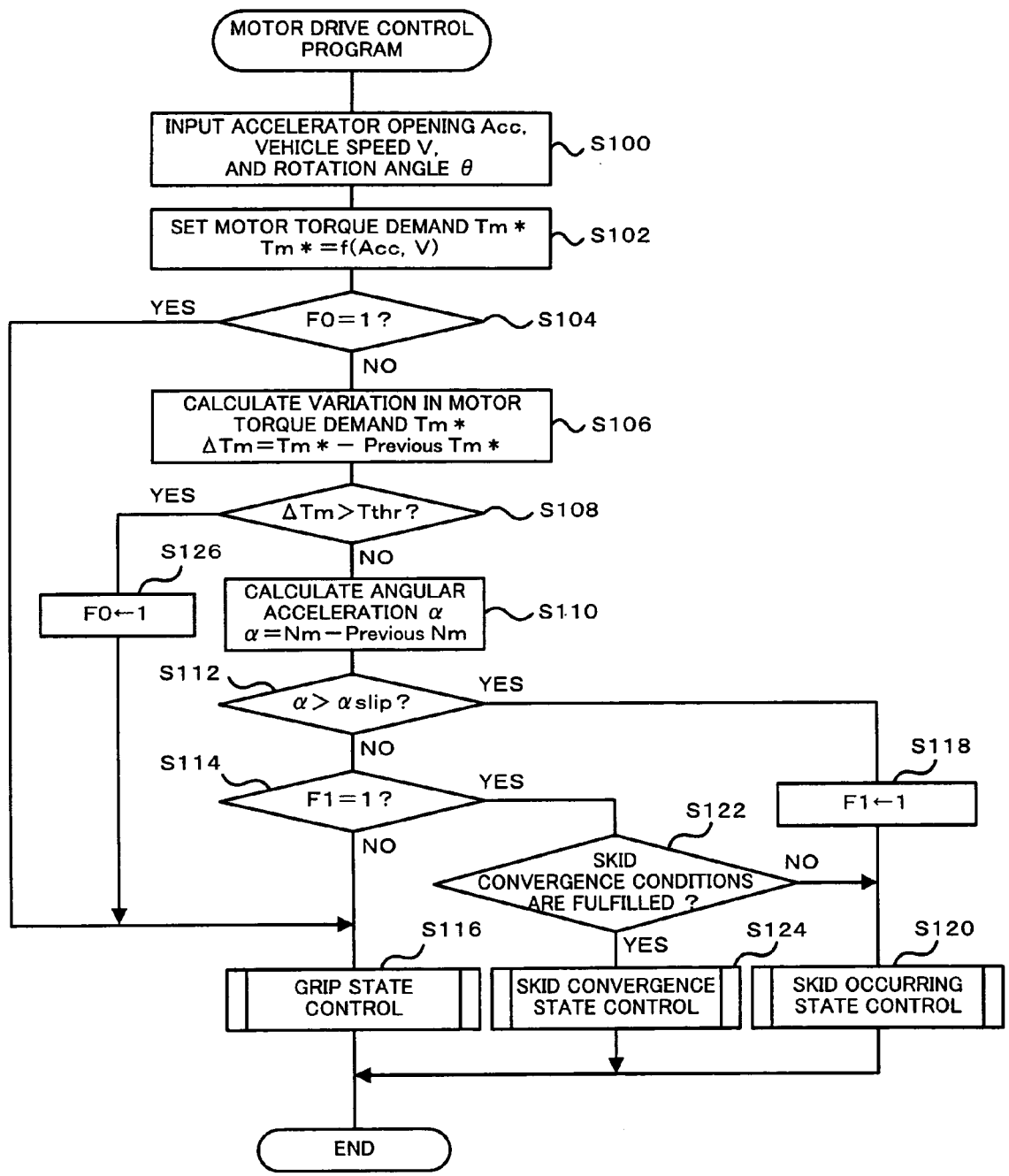
FIG. 2 is a flowchart showing a motor drive control program executed in the electric vehicle.

The description regards the operations of the electric vehicle 10 constructed as discussed above, especially a series of operations of driving and controlling the motor 12 in the event of occurrence of a skid of the drive wheels 18a and 18b. FIG. 2 is a flowchart showing a motor drive control program executed by the electronic control unit 40 in the first embodiment. This control program is read from the ROM 44 and is executed repeatedly at preset time intervals (for example, at every 8 msec).

Figure 3:
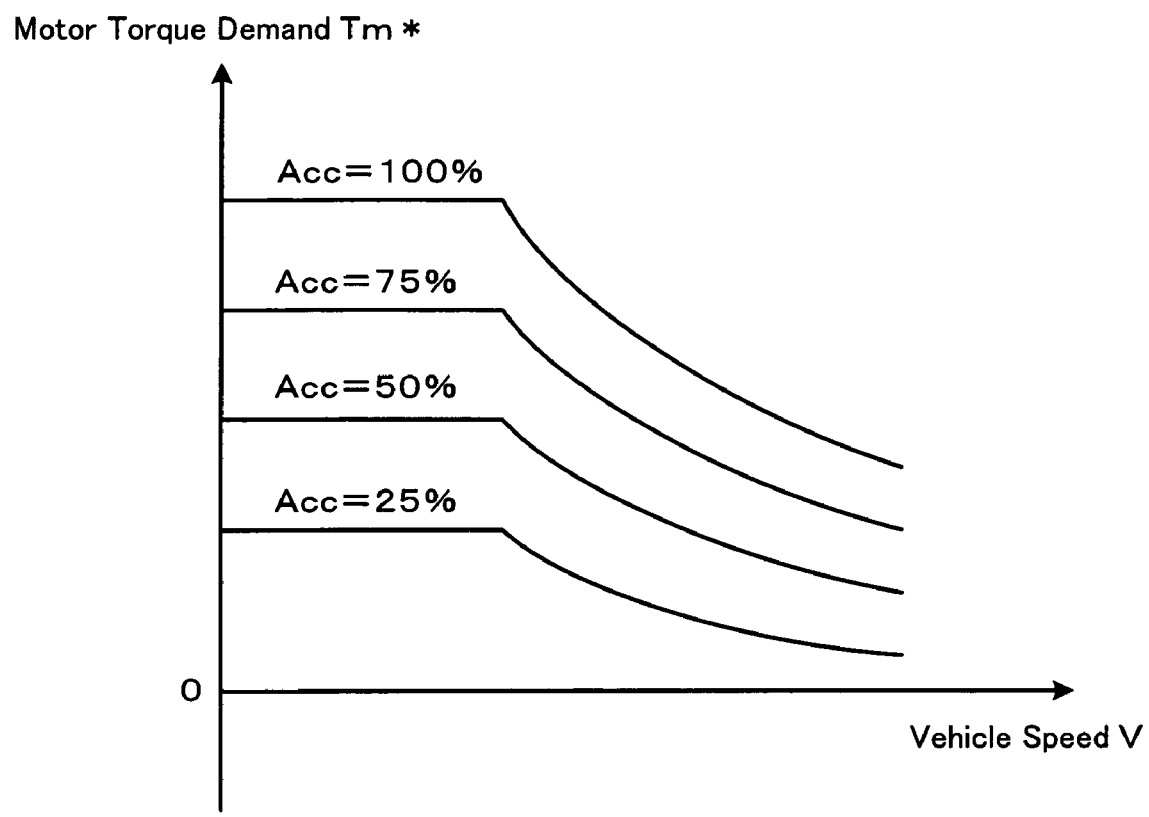
FIG. 3 shows a map of setting a motor torque demand to an accelerator opening and a vehicle speed.

When the motor drive control program starts, the CPU 42 of the electronic control unit 40 first inputs the accelerator opening Acc from the accelerator pedal position sensor 34, the vehicle speed V from the vehicle speed sensor 24, and the rotation angle θ from the rotation angle sensor 22 (step S100). The CPU 42 then sets a torque command value of the drive wheels 18a and 18b or a torque demand Tm* of the motor 12 according to the input accelerator opening Acc and the input vehicle speed V (step S102). A concrete procedure of setting the motor torque demand Tm* in this embodiment stores in advance variations in motor torque demand Tm* against the accelerator opening Acc and the vehicle speed V as a map in the ROM 44 and reads the motor torque demand Tm* corresponding to the given accelerator opening Acc and the given vehicle speed V from the map. One example of this map is shown in FIG. 3.

The CPU 42 subsequently determines whether a torque restriction prohibition flag F0 is set equal to 1 (step S104). The torque restriction prohibition flag F0 is set to 1 to prohibit torque restriction, while being reset to 0 to allow torque restriction. The torque restriction is carried out according to skid occurring state control executed at step S120 or according to skid convergence state control executed at step S124 as discussed later. When it is determined at step S104 that the torque restriction prohibition flag F0 is equal to 0, the CPU 42 calculates a variation ΔTm in motor torque demand Tm* (step S106). The calculation of the variation ΔTm in motor torque demand Tm* in this embodiment subtracts a previous motor torque demand Tm* set in a previous cycle of this program from a current motor torque demand Tm* set in the current cycle of this program (current motor torque demand Tm*−previous motor torque demand Tm*). This program is repeatedly executed at every 8 msec, so that the variation ΔTm in motor torque demand Tm* represents a rate of change at every 8 msec. The calculated variation ΔTm in motor torque demand Tm* is compared with a preset threshold value Tthr (step S108). When the calculated variation ΔTm is not greater than the preset threshold value Tthr, the program goes to step S110. When the calculated variation ΔTm is greater than the preset threshold value Tthr, on the other hand, the CPU 42 sets the torque restriction prohibition flag F0 to 1 (step S126), executes grip state control (step S116) as discussed later, and terminates this motor drive control program. When it is determined at step S104 that the torque restriction prohibition flag F0 is equal to 1, the CPU 42 also executes the grip state control (step S116) as discussed later and terminates this motor drive control program.

The threshold value Tthr is set corresponding to an empirical value of the variation ΔTm in motor torque demand Tm*, which is caused by the driver's increased depression of the accelerator pedal. Under the condition of a large variation ΔTm in motor torque demand Tm*, for example, on the occasion of the driver's increased depression of the accelerator pedal, the significant torque change may lead to some vibration of the vehicle 10 to temporarily heighten an angular acceleration α. The temporary rise of the angular acceleration α may cause the angular acceleration α to exceed a preset threshold value αslip and result in misdetection of the occurrence of a 'phantom' skid, which actually does not exist, in an angular acceleration α-based skid state determination (step S112). The motor drive control program of this embodiment accordingly compares the calculated variation ΔTm in motor torque demand Tm* with the preset threshold value Tthr at step S108 and specifies a potential for misdetection of the occurrence of a 'phantom' skid under the condition of the variation ΔTm over the preset threshold value Tthr. The motor drive control program thereby skips the processing of step S112 and relevant steps to eliminate the potential for execution of the torque restriction according to the skid occurring state control (step S120) or according to the skid convergence state control (step S124), and immediately goes to step S116 to execute the grip state control.

When the calculated variation ΔT in motor torque demand Tm* is not greater than the preset threshold value Tthr at step S108, the CPU 42 computes a motor rotation speed Nm from the rotation angle θ input at step S100 and calculates the angular acceleration α from the computed motor rotation speed Nm (step S110). The calculation of the angular acceleration α in this embodiment subtracts a previous rotation speed Nm computed in the previous cycle of this program from a current rotation speed Nm computed in the current cycle of this program (current rotation speed Nm−previous rotation speed Nm). The unit of the angular acceleration α is [rpm/8 msec] since the execution interval of this program is 8 msec in this embodiment, where the rotation speed Nm is expressed by the number of rotations per minute [rpm]. Any other suitable unit may be adopted for the angular acceleration α as long as the angular acceleration α is expressible as a time rate of change of rotation speed. In order to minimize a potential error, the angular acceleration α may be an average of angular accelerations calculated in a preset number of cycles of this program (for example, 3).

The CPU 42 determines a skid state of the drive wheels 18a and 18b based on the calculated angular acceleration α (step S112). The calculated angular acceleration α is compared with the preset threshold value αslip, which suggests the occurrence of a skid due to wheelspin. When the calculated angular acceleration α exceeds the preset threshold value αslip, the CPU 42 determines the occurrence of a skid of the wheels 18a and 18b, sets the value '1' to a skid occurrence flag F1 representing the occurrence of a skid (step S118), and executes the skid occurring state control (step S120) as discussed later, before terminating this motor drive control program.

When the calculated angular acceleration α does not exceed the preset threshold value αslip at step S112, the CPU 42 detects the value of the skid occurrence flag F1 (step S114) When the skid occurrence flag F1 is equal to 1 at step S114, the CPU 42 subsequently determines whether the calculated angular acceleration α has been kept negative for a preset time period, that is, whether skid convergence conditions are fulfilled (step S122). In the case of successful fulfillment of the skid convergence conditions at step S122, the CPU 42 determines convergence of the skid occurring on the drive wheels 18a and 18b and executes the skid convergence state control (step S124) as discussed below, before terminating this motor drive control program. In the case of failed fulfillment of the skid convergence conditions at step S122, on the contrary, the CPU 42 determines no convergence of the skid and executes the skid occurring state control (step S120) as discussed below, before terminating this motor drive control program. When the skid occurrence flag F1 is not equal to 1 at step S114, the CPU 42 determines grip of the drive wheels 18a and 18b on the road surface and executes the grip state control (step S116) as discussed below, before terminating this motor drive control program.

The grip state control executed at step S116, the skid occurring state control executed at step S120, and the skid convergence state control executed at step S124 are described below in this sequence.

Figure 4:
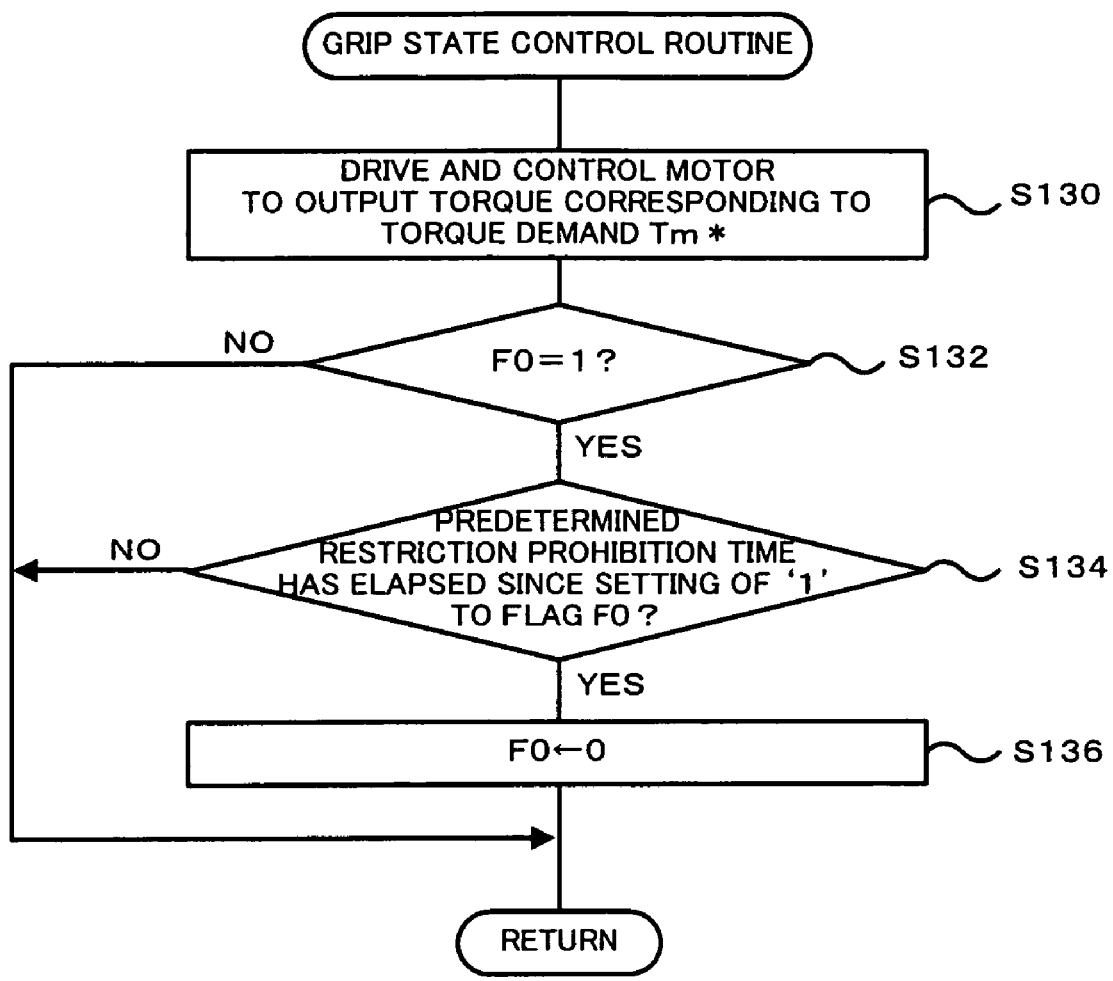
FIG. 4 is a flowchart showing a grip state control routine.

The grip state control is executed as drive control of the motor 12 in the ordinary state and on prohibition of torque restriction and follows a grip state control routine shown in the flowchart of FIG. 4. In the grip state control routine, the CPU 42 of the electronic control unit 40 first drives and controls the motor 12 to output a torque corresponding to the given motor torque demand Tm* (step S130), and determines whether the torque restriction prohibition flag F0 is set to 1 (step S132). The grip state control routine is immediately terminated in the case of the torque restriction prohibition flag F0 equal to 0, that is, in allowance of torque restriction. In the case of the torque restriction prohibition flag F0 equal to 1, that is, on prohibition of torque restriction, on the other hand, the CPU 42 determines whether a predetermined restriction prohibition time has elapsed since the setting of the value '1' to the torque restriction prohibition flag F0 (step S134). This grip state control routine is terminated here when the predetermined restriction prohibition time has not yet elapsed. When the predetermined restriction prohibition time has already elapsed, on the contrary, the CPU 42 resets the torque restriction prohibition flag F0 to 0 (step S136), before exiting from this grip state control routine. The restriction prohibition time is specified as a time width of prohibiting torque restriction. The driver's increased depression of the accelerator pedal may cause the variation ΔTm in motor torque demand Tm* to exceed the preset threshold value Tthr. Such a torque change may lead to some vibration of the vehicle 10 to temporarily heighten the angular acceleration α. The restriction prohibition time is set corresponding to an empirical value of convergence time between a start and an end of the rise of the angular acceleration α. The grip state control routine drives and controls the motor 12 to output a torque corresponding to the motor torque demand Tm* under the condition of the grip of the drive wheels 18a and 18b on the road surface or on prohibition of torque restriction.

Figure 5:
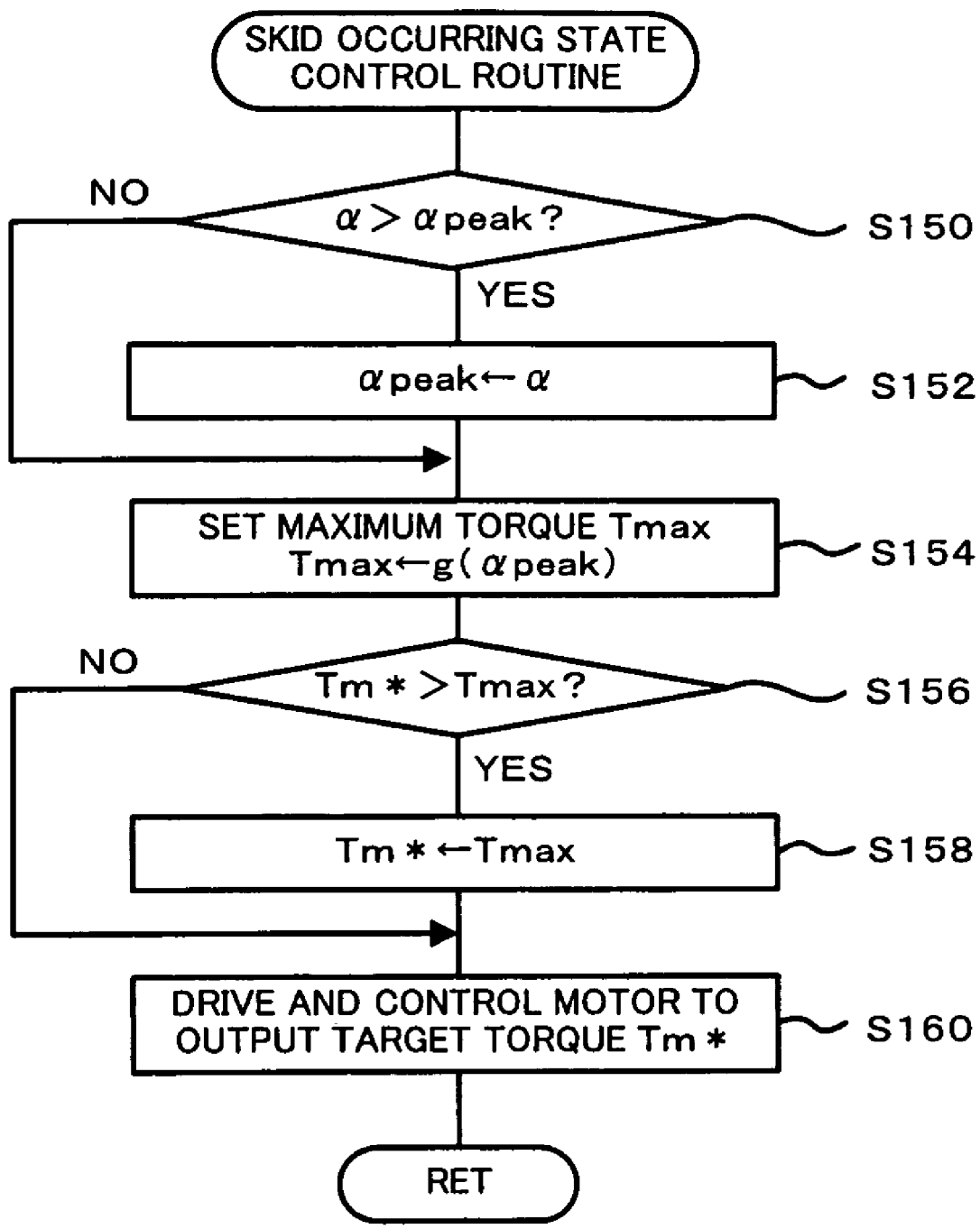
FIG. 5 is a flowchart showing a skid occurring state control routine.
Figure 6:
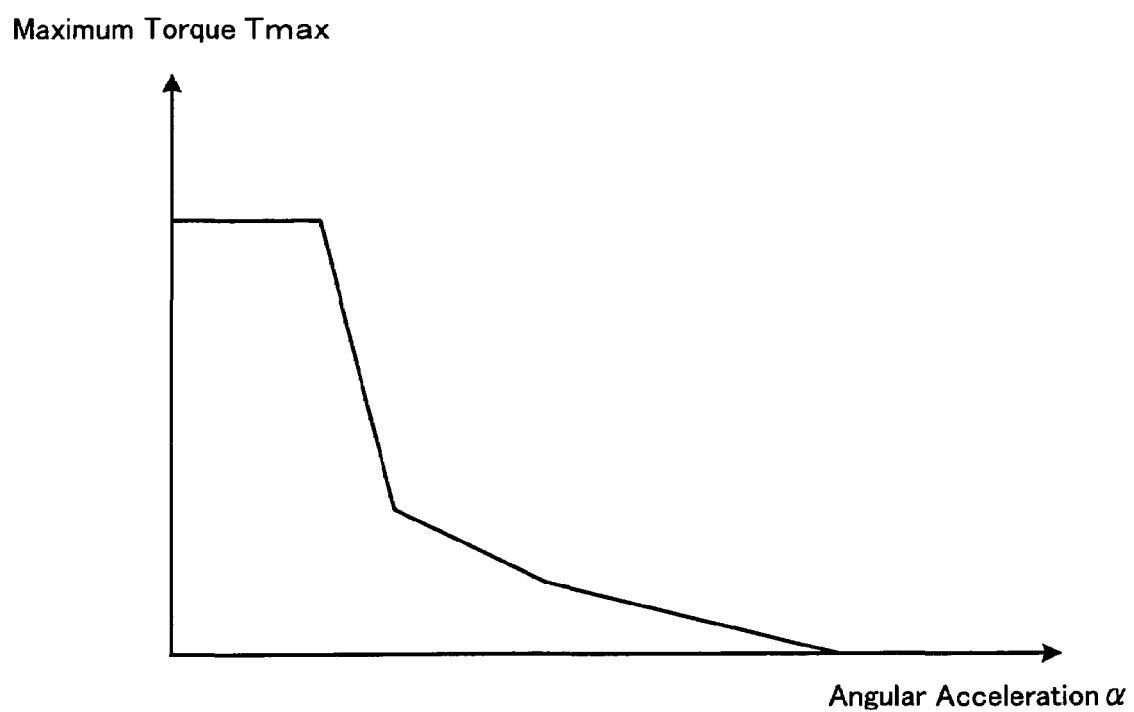
FIG. 6 shows a map of setting a maximum torque to angular acceleration of a motor.

The skid occurring state control is executed as drive control of the motor 12 to lower the angular acceleration α, which was increased by the occurrence of a skid, and follows a skid occurring state control routine shown in the flowchart of FIG. 5. In the skid occurring state control routine, the CPU 42 of the electronic control unit 40 first compares the angular acceleration α with a preset peak value αpeak (step S150). When the angular acceleration α exceeds the preset peak value αpeak, the peak value αpeak is updated to the current value of the angular acceleration α (step S152). The peak value αpeak represents a peak of the angular acceleration α increasing due to a skid and is initially set equal to 0. Until the angular acceleration α increases to reach its maximum, the peak value αpeak is successively updated to the current value of the angular acceleration α. When the increasing angular acceleration α reaches its maximum, the maximum value of the increasing angular acceleration α is fixed to the peak value αpeak. After setting the peak value αpeak, the CPU 42 sets a maximum torque Tmax as an upper limit of torque output from the motor 12 corresponding to the peak value αpeak (step S154). The procedure of this embodiment refers to a map shown in FIG. 6 to set the maximum torque Tmax. FIG. 6 shows a variation in maximum torque Tmax against the angular acceleration α. Namely the maximum torque Tmax is given as a function g(α) of the angular acceleration α. As illustrated in this map, the maximum torque Tmax decreases with an increase in angular acceleration α. The greater peak value αpeak with an increase in angular acceleration α, that is, the heavier skid, sets the smaller value to the maximum torque Tmax and limits the output torque of the motor 12 to the smaller maximum torque Tmax.

After setting the maximum torque Tmax, the motor torque demand Tm* is compared with the maximum torque Tmax (step S156). When the motor torque demand Tm* exceeds the maximum torque Tmax, the motor torque demand Tm* is limited to the maximum torque Tmax (step S158). The CPU 42 then sets the motor torque demand Tm* to a target torque and drives and controls the motor 12 to output a torque corresponding to the target torque Tm* (step S160), before exiting from this skid occurring state control routine. The torque output from the motor 12 in the occurrence of a skid is limited to a lower level (that is, the maximum torque Tmax corresponding to the peak value αpeak of the angular acceleration in the map of FIG. 6) for immediate reduction of the skid. This limitation effectively reduces the skid.

The skid convergence state control is executed as drive control of the motor 12 to restore the restricted torque level in response to a decrease in angular acceleration α under torque restriction in the skid occurring state control. The skid convergence state control raises the maximum torque Tmax stepwise after every elapse of a preset standby time, limits the motor torque demand Tm*, which exceeds the maximum torque Tmax, to the maximum torque Tmax, and drives and controls the motor 12 to attain the motor torque demand Tm*. The procedure of setting the maximum torque Tmax integrates the angular acceleration α to give a time integration αint thereof over an integration interval between a time point when the angular acceleration α exceeds the threshold value αslip and a time point when the angular acceleration α decreases below the threshold value αslip. The procedure computes a guard value δ (expressed by the same unit [rpm/8 msec] as the angular acceleration) as a function of the time integration αint. The procedure reads the maximum torque Tmax corresponding to the computed guard value δ from the map of FIG. 6 and sets the corresponding value to the maximum torque Tmax as an initial value in the skid convergence state control. After every elapse of the preset standby time, the guard value δ is decremented by a fixed level Δδ and is updated, and the maximum torque Tmax is updated to the value corresponding to the decremented guard value δ in the map of FIG. 6. The skid convergence state control resets both the torque restriction prohibition flag F0 and the skid occurrence flag F1 in response to the eventual decrease of the guard value δ to or below 0, before being terminated.

Figure 7:
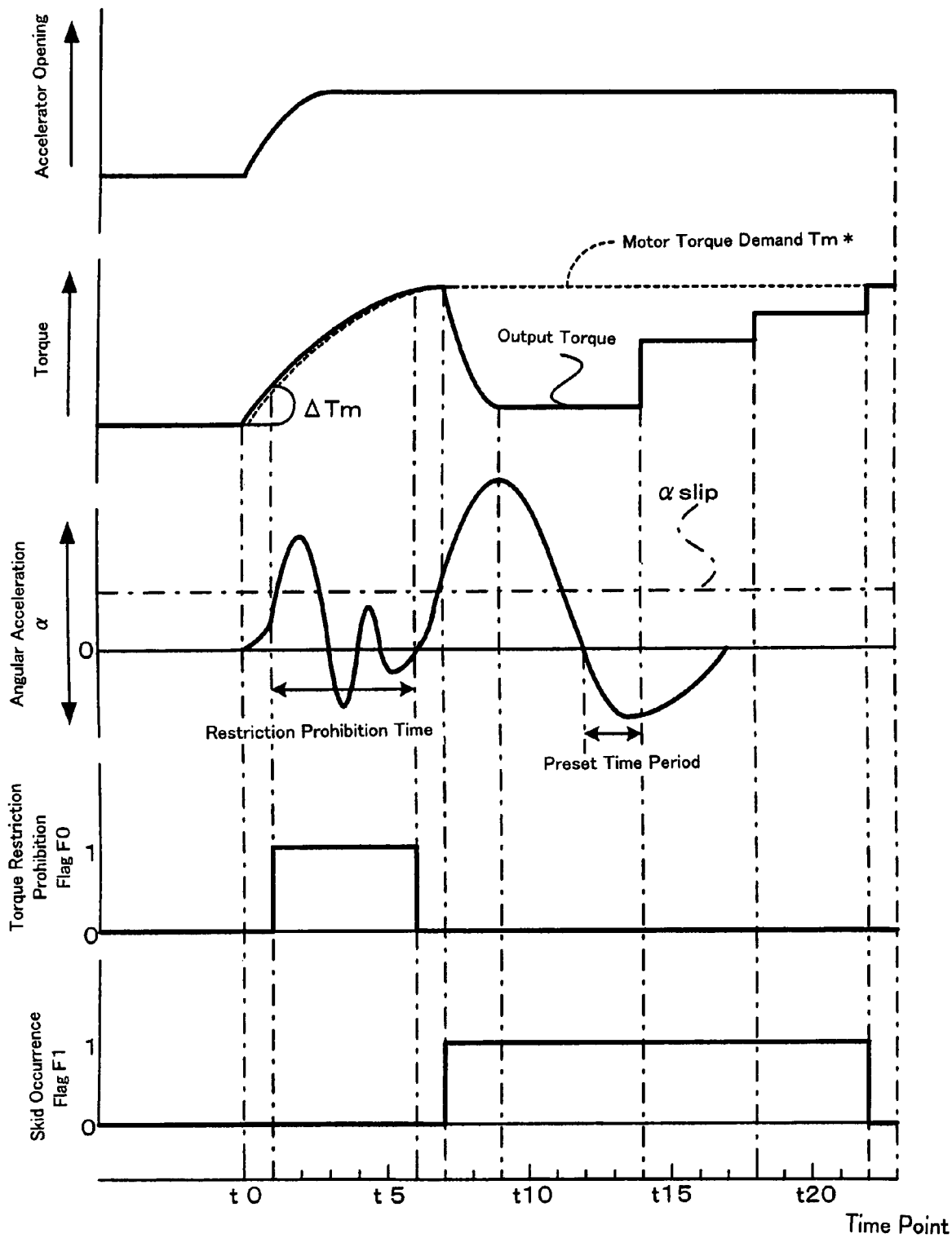
FIG. 7 shows a time variations of the accelerator opening, an output torque, the angular acceleration, and respective flags.
Figure 8:
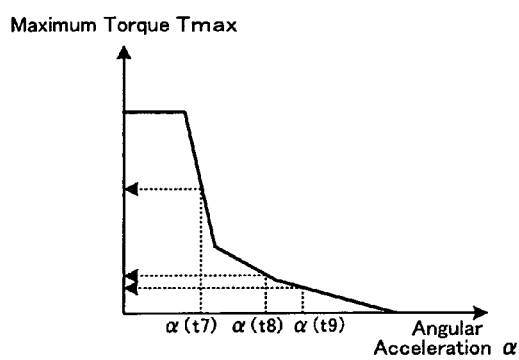
FIG. 8 shows a process of setting the maximum torque corresponding to the time variation of the angular acceleration.
Figure 8:
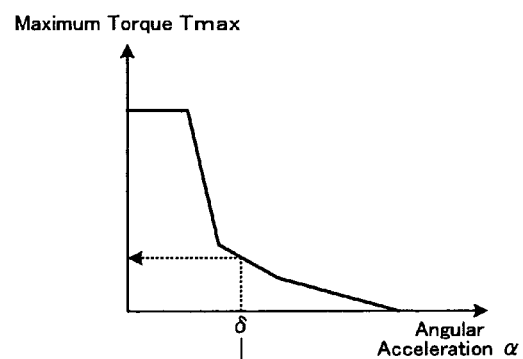
Figure 8:
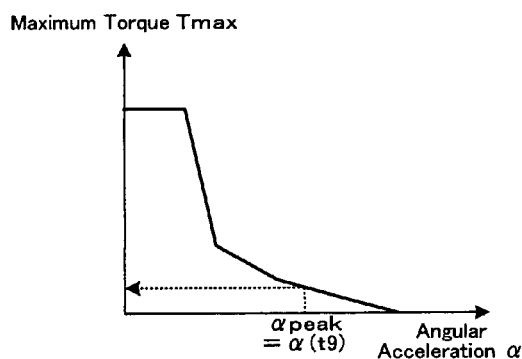
Figure 8:
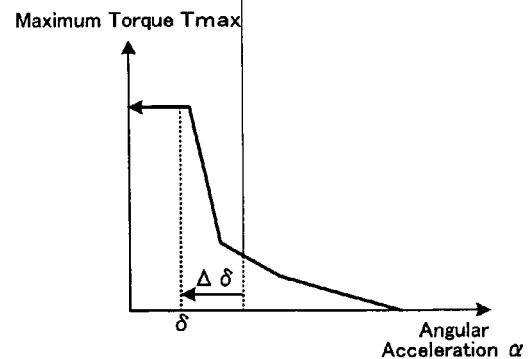

FIG. 7 shows a time variation of the accelerator opening, a time variation of the angular acceleration α, a time variation of the output torque from the motor 12, and time variations of the respective flags. FIG. 8 shows a process of setting the maximum torque Tmax corresponding to the time variation of the angular acceleration α. In this illustrated example, it is assumed that a time interval between a time point tn and a precedent time point tn-1 is 40 msec (when the motor drive control program of FIG. 2 repeated at every 8 msec is executed 5 times).

In the illustrated example of FIG. 7, the driver steps on the accelerator pedal at a time point t0 when the vehicle 10 is at a stop or is running at a low speed. The depression of the accelerator pedal continues to at least a time point t23. In response to the driver's depression of the accelerator pedal, the motor torque demand Tm* increases abruptly at the initial stage and then gradually in a time period between the time points t0 and t7 and reaches a plateau at the time point t7 to have a substantially fixed value, as shown by the dotted line in FIG. 7. The variation ΔTm in motor torque demand Tm* between the time points t0 and t1 exceeds the preset threshold value Tthr. The torque restriction prohibition flag F0 is accordingly set to 1 at the time point t1.

In a time period between the time points t0 and t1, both the torque restriction prohibition flag F0 and the skid occurrence flag F1 are set equal to 0. The grip state control is accordingly executed to drive and control the motor 12 to output a torque corresponding to the motor torque demand Tm*. In a time period between the time points t1 and t6, the torque restriction prohibition flag F0 is set equal to 1. The grip state control is thus executed again, and the torque restriction prohibition flag F0 is reset to 0 at the time point t6 after elapse of the predetermined restriction prohibition time (set equal to 200 msec in this example). During the time period between the time points t1 and t6, the significant torque change varies the angular acceleration α to temporarily exceed the preset threshold value a slip. Not the skid occurring state control but the grip state control without torque restriction is, however, executed in this time period. The torque level output from the motor 12 is thus practically identical with the motor torque demand Tm*.

At the time point t7, the torque restriction prohibition flag F0 is set equal to 0, which represents allowance of torque restriction. The angular acceleration α-based skid state determination is accordingly executed at this time point. At this moment, the angular acceleration α exceeds the preset threshold value αslip, so that the skid occurrence flag F1 is set to 1 to start the skid occurring state control. The maximum torque Tmax is occasionally updated corresponding to the increasing angular acceleration α in the map of FIG. 6 until the increasing angular acceleration α reaches its peak at a time point t9 (see FIG. 8(a)). The motor torque demand Tm* exceeds the maximum torque Tmax under such torque restriction. The output torque from the motor 12 is accordingly limited to the maximum torque Tmax. In a time period between time points t10 and t13, the maximum torque Tmax is fixed corresponding to the peak value αpeak of the angular acceleration α (see FIG. 8(b)). The motor torque demand Tm* exceeds the maximum torque Tmax under such torque restriction. The output torque from the motor 12 is accordingly limited to the maximum torque Tmax.

At a time point t14, the skid convergence conditions are satisfied, that is, the angular acceleration α as been kept negative for the preset time period. Convergence of the skid is accordingly detected at this time point. The skid convergence state control is executed after the time point t14 to calculate the time integration αint of the angular acceleration α, compute the guard value δ as the function of the time integration αint, read the maximum torque Tmax corresponding to the computed guard value δ from the map of FIG. 6 (see FIG. 8(c)), and set the corresponding value to the maximum torque Tmax as the initial value in the skid convergence state control. After every elapse of the predetermined standby time, the guard value δ is decremented by the fixed level Δδ and is updated, and the maximum torque Tmax is updated corresponding to the decremented guard value δ in the map of FIG. 6 (see FIG. 8(d)). At the time point t23 when the guard value δ eventually decreases to or below 0, the skid convergence state control is terminated after resetting both the torque restriction prohibition flag F0 and the skid occurrence flag F1 to 0. After the time point t23, the torque level output from the motor 12 is again equivalent to the motor torque demand Tm*.

The CPU 42 included in the electronic control unit 40 of this embodiment corresponds to the angular acceleration measurement module, the skid detection module, the torque restriction module, the state determination module, and the torque restriction prohibition module of the invention. The processing of step S110 and the processing of step S112 executed by the CPU 42 are respectively equivalent to the processing of the angular acceleration measurement module and the processing of the skid detection module. The skid occurring state control routine executed at step S120 and the skid convergence state control routine executed at step S124 are equivalent to the processing of the torque restriction module. The processing of steps S104 and S108 executed by the CPU 42 is equivalent to the processing of the state determination module. The grip state control routine executed at step S116 in the setting of the value '1' to the torque restriction prohibition flag F0 is equivalent to the processing of the torque restriction prohibition module. The CPU 42 also corresponds to the torque variation detection module, and the processing of step S108 executed by the CPU 42 is equivalent to the processing of the torque variation detection module. The processing of step S108 executed by the CPU 42 is equivalent to the processing of the torque variation detection module. The variation ΔTm in motor torque demand Tm* over the preset threshold value Tthr is equivalent to the variation in torque command value of the drive wheels 18a and 18b out of the preset range.

As described above, in response to detection of the occurrence of a skid based on the variation in angular acceleration α of the drive shaft linked to the drive wheels 18a and 18b, the control procedure of this embodiment limits the output torque of the motor 12 for immediate reduction of the skid and thereby restricts the driving torque of the drive wheels 18a and 18b. A significant variation in angular acceleration α in the vehicle driving state with no occurrence of a skid, for example, a significant increase in variation ΔTm of the motor torque demand Tm* over the preset threshold value Tthr caused by the driver's depression of the accelerator pedal, may lead to misdetection of a phantom skid. Restriction of the output torque of the motor 12 is accordingly prohibited under such conditions. The control procedure of this embodiment thus effectively prevents unnecessary restriction of the output torque in response to misdetection of a phantom skid in the angular acceleration α-based skid state determination. Prohibition or allowance of torque restriction is determined according to the variation ΔTm in motor torque demand Tm*. Such determination enables prohibition of restriction of the motor output torque not after but before the actual torque restriction. The control procedure of this embodiment detects the occurrence of a skid when the angular acceleration α exceeds the preset threshold value αslip. This ensures easy and accurate detection of the occurrence of a skid. The restriction of the motor output torque is prohibited only for the predetermined restriction prohibition time. In the event of the occurrence of a skid after elapse of the predetermined restriction prohibition time, the control procedure promptly sets the torque restriction for immediate reduction of the skid.

SECOND EMBODIMENT

Figure 9:
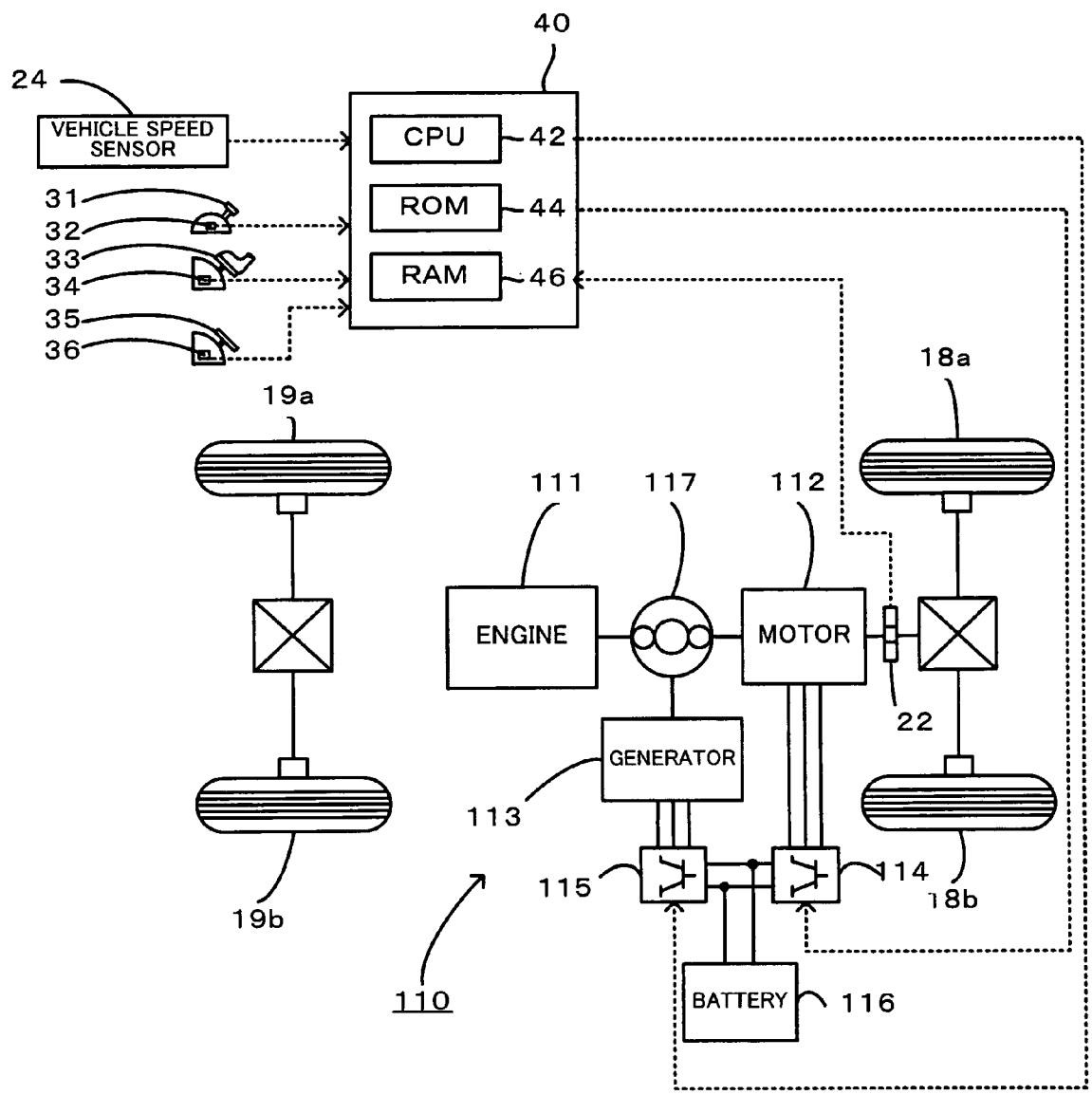
FIG. 9 schematically illustrates the configuration a hybrid vehicle.

FIG. 9 schematically illustrates the configuration of a hybrid vehicle 110 equipped with an electronic control unit 40 that functions as a skid control device in another embodiment of the invention. The like elements in the configuration of FIG. 9 to those of the first embodiment are expressed by the like numerals and symbols and are not specifically described here. As illustrated, the hybrid vehicle 110 includes an engine 111, a planetary gear 117 that is linked to the engine 111 and divides the output power of the engine 111 into drive wheels 18a and 18b and a generator 113, the generator 113 that is connected with the planetary gear 117 and generates electric power, and a motor 112 that is also connected with the planetary gear 117 and is designed to directly output power to a drive shaft linked to the drive wheels 18a and 18b. The motor 112 is connected to a battery 116 via an inverter circuit 114, while the generator 113 is connected to the battery 116 via an inverter circuit 115. The electronic control unit 40 outputs switching control signals to switching elements included in these inverter circuits 114 and 115. The electronic control unit 40 executes series of skid control to restrict the driving torque of the drive wheels 18a and 18b in response to detection of the occurrence of a skid of the drive wheels 18a and 18b and thereby reduce the skid.

The operations of the hybrid vehicle 110 having the above construction are described below. A hybrid ECU (not shown) executes series of hybrid control to drive the hybrid vehicle 10 with either one or both of the engine 111 and the motor 112 as the power source. In a drive range of poor engine efficiency, for example, at a start of the vehicle or during a low-speed drive of the vehicle, the hybrid control stops the engine 111 and drives the drive wheels 18a and 18b with the output power of the motor 112. In the ordinary driving state, the hybrid control activates the engine 111 and divides the output power of the engine 111 into the drive wheels 18a and 18b and the generator 113 by the function of the planetary gear 117. The hybrid control also activates the generator 113 to generate the electric power and actuates the motor 112 with the generated electric power to assist the drive of the drive wheels 18a and 18b. Under high loading conditions, for example, at the time of full throttle acceleration, the battery 116 is controlled to give an additional supply of electric power to the motor 112 and thereby supplement the insufficiency of the required driving force.

Figure 10:
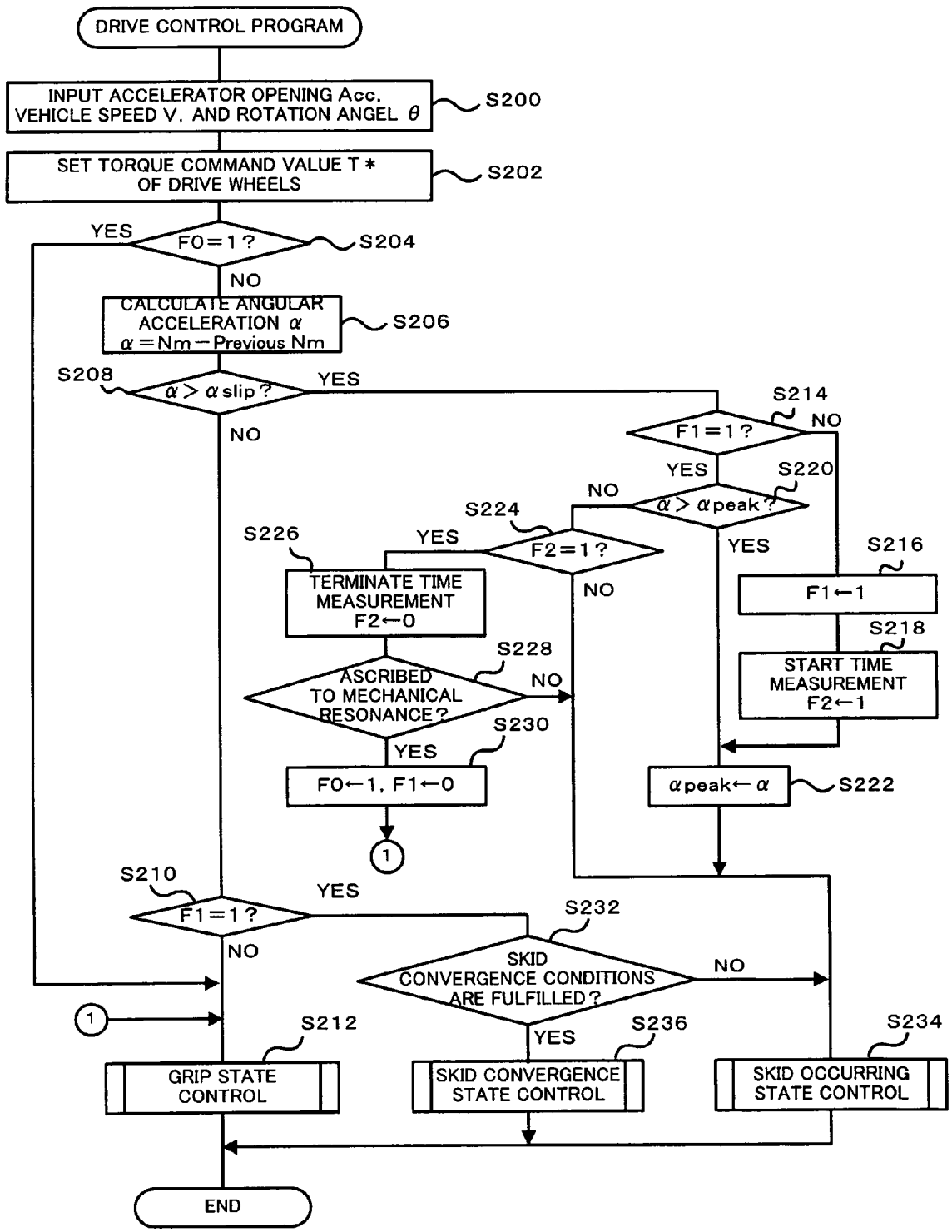
FIG. 10 is a flowchart showing a drive control program executed in the hybrid vehicle.

The description regards the operations of the hybrid vehicle 110, especially a series of drive control in the event of the occurrence of a skid of the drive wheels 18a and 18b. FIG. 10 is a flowchart showing a drive control program executed by the electronic control unit 40. This drive control program is read from the ROM 44 and is executed repeatedly at preset time intervals (for example, at every 8 msec).

When the drive control program starts, the CPU 42 of the electronic control unit 40 first inputs the accelerator opening Acc, the vehicle speed V, and the rotation angle θ of the drive shaft linked to the drive wheels 18a and 18b (step S200). The CPU 42 then sets a torque command value T* of the drive shaft linked to the drive wheels 18a and 18b (step S202). A concrete procedure in this embodiment reads a torque command value T* corresponding to the input accelerator opening Acc and the input vehicle speed V from a map that is similar to FIG. 3 and represents variations in torque command value T* against the accelerator opening Acc and the vehicle speed V. The CPU 42 then determines whether the torque restriction prohibition flag F0 is set equal to 1 (step S204). In the setting of the value '0' to the torque restriction prohibition flag F0 at step S204, that is, in allowance of torque restriction, the CPU 42 calculates the angular acceleration α of the drive shaft of the drive wheels 18a and 18b (step S206) and determines the skid state of the drive wheels 18a and 18b, based on a comparison between the calculated angular acceleration α and the preset threshold value αslip (step S208) The calculation of the angular acceleration α and the determination of the skid state follow the procedure of the first embodiment and are thus not specifically described here.

Figure 11:
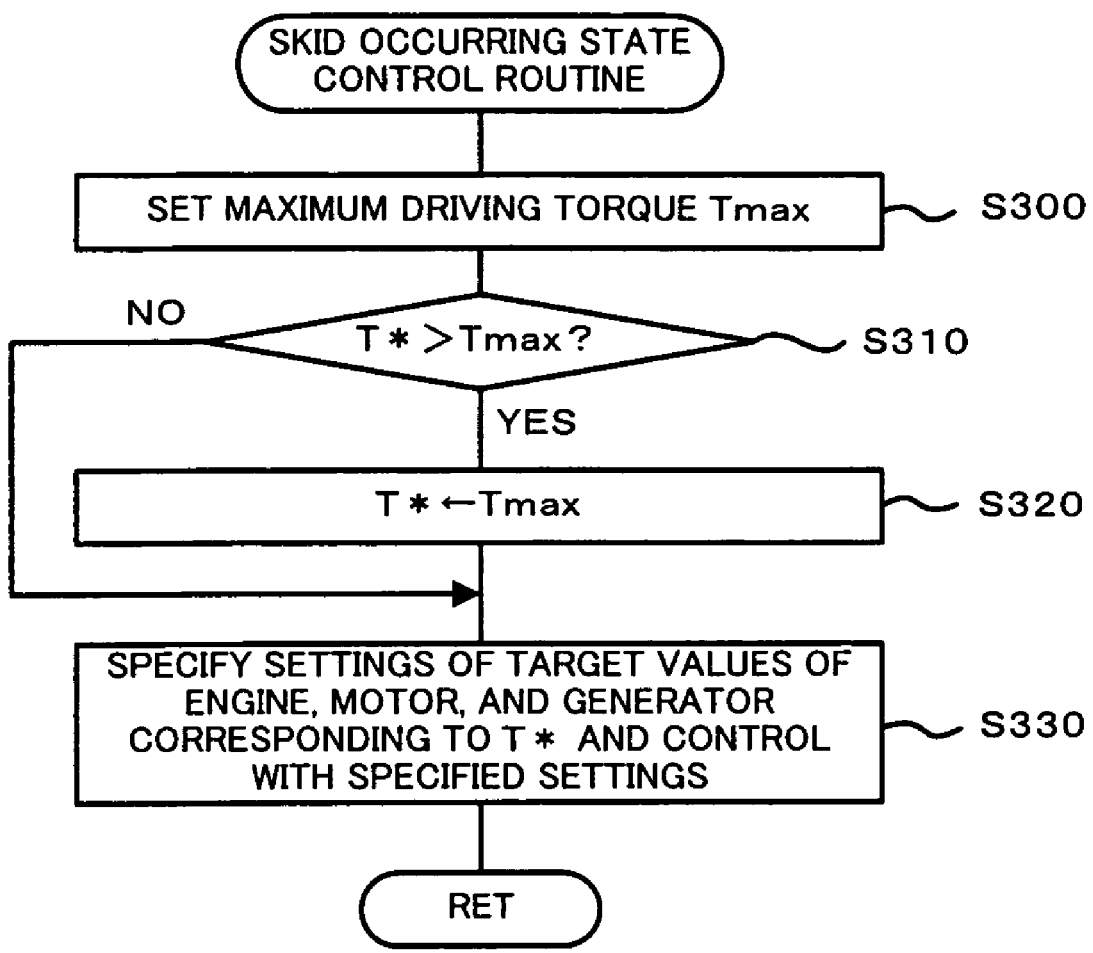
FIG. 11 is a flowchart showing a skid occurring state control routine.

When the angular acceleration α exceeds the preset threshold value αslip at step S208, the CPU 42 subsequently determines whether the skid occurrence flag F1 is set equal to 1 (step S214). When the skid occurrence flag F1 is equal to 0, that is, when the angular acceleration α did not exceed the preset threshold value αslip in the previous cycle but exceeds the preset threshold value αslip in the current cycle, the CPU 42 sets the skid occurrence flag F1 to 1 (step S216) and starts time measurement and sets a time count flag F2 to 1 (step S218). The time count flag F2 is set to 1 during time measurement and is otherwise reset to 0. The CPU 42 sets the current angular acceleration α to the peak value αpeak (step S222) and executes skid occurring state control (step S234), before terminating this drive control program. The skid occurring state control of this embodiment follows a skid occurring state control routine shown in the flowchart of FIG. 11. The skid occurring state control routine sets a maximum torque Tmax as an upper limit of driving torque of the drive wheels 18a and 18b as a function of the peak value αpeak by referring to a map similar to FIG. 6 (step S300), and compares the torque command value T* set at step S202 with the maximum torque Tmax (step S310). When the torque command value T* does not exceed the maximum torque Tmax, the control routine goes to step S330. When the torque command value T* exceeds the maximum torque Tmax, on the other hand, the control routine limits the torque command value T* to the maximum torque Tmax (step S320) and then goes to step S330. The control routine specifies settings of target torques and target rotation speeds of the engine 111, the motor 112, and the generator 113 corresponding to the torque command value T* and controls the engine 111, the motor 112, and the generator 113 with the specified settings at step S330.

One example of such settings is described, where it is assumed that the battery 116 does not require charging and all a power demand P* of the drive wheels 18a and 18b is covered by the output power of the engine 111. The procedure first calculates a power demand P*(=T*×N) to be output to the drive shaft linked to the drive wheels 18a and 18b from the torque command value T* and a rotation speed N of the drive shaft (computable from the rotation angle θ). The power demand P* is given as the product of a target torque Te* and a target rotation speed Ne* of the engine 111. The target torque Te* and the target rotation speed Ne* are read from a map (not shown) representing available combinations of the torque and the rotation speed to attain the high driving efficiency of the engine 111. A target torque Tm* of the motor 112 is then set according to the torque command value T* of the drive wheels 18a and 18b, the target torque Te* of the engine 111, and a preset gear ratio of the planetary gear 117. A target rotation speed of the generator 113 is set according to the target rotation speed Ne* of the engine 111 and the rotation speed N of the drive shaft.

When the skid occurrence flag F1 is equal to 1 at step S214, that is, when the angular acceleration α exceeded and exceeds the preset threshold value αslip in the previous cycle and in the current cycle, the angular acceleration α is compared with the peak value αpeak (step S220). When the angular acceleration α exceeds the peak value αpeak, the CPU 42 updates the peak value αpeak to the current angular acceleration α (step S222) and executes the skid occurring state control (step S234), before terminating this drive control program. When the angular acceleration α does not exceed the peak value αpeak at step S220, on the other hand, the maximum of the angular acceleration α is fixed to the peak value speak. Namely the peak value αpeak represents a starting point of a decreasing tendency of the angular acceleration α after its increase over the threshold value αslip. The CPU 42 then determines whether the time count flag F2 is set equal to 1 (step S224). In the setting of the value '1' to the time count flag F2, the CPU 42 terminates the time measurement and resets the time count flag F2 to 0 (step S226) and specifies the cause of the increase in angular acceleration α over the preset threshold value αslip based on the result of time measurement, that is, due to mechanical resonance at the start of the engine 111 or due to the occurrence of a skid (step S228). When the increase in angular acceleration α is ascribed to the mechanical resonance, the CPU 42 sets the torque restriction prohibition flag F0 to 1 and resets the skid occurrence flag F1 to 0 (step S230) and executes grip state control (step S212), before terminating this drive control program. The grip state control is executed according to the grip state control routine of the first embodiment (see FIG. 4) with a little modification (the processing of step S130 is modified to specify settings of the target torques and the target rotation speeds of the engine 111, the motor 112, and the generator 113 corresponding to the torque command value T* and to control the engine 111, the motor 112, and the generator 113 with the specified settings) and is thus not described in detail here. In the setting of the value '1' to the torque restriction prohibition flag F0 at step S204, the drive control program also executes the grip state control (step S212).

The mechanical resonance is caused by, for example, some vibration at the start of the engine 111. The mechanical resonance temporarily heightens the angular acceleration α to exceed the preset threshold value αslip. This temporary rise of the angular acceleration α may result in misdetection of the occurrence of a 'phantom' skid. The angular acceleration α increasing over the threshold value αslip due to the mechanical resonance reaches its peak in a relatively short time, whereas the angular acceleration α increasing over the threshold value αslip due to the occurrence of a skid reaches its peak in a relatively long time. The processing of step S228 accordingly ascribes the increase in angular acceleration α to the mechanical resonance, based on the relatively short time measured. In this case, the drive control program does not execute the skid occurring state control (step S234) or skid convergence state control (step S236) but executes the grip state control without torque restriction at step S212.

When the increase in angular acceleration α over the threshold value αslip is ascribed to the occurrence of a skid based on the result of time measurement at step S228, the drive control program executes the skid occurring state control (step S234). In the setting of the value '0' to the time count flag F2 at step S224, the drive control program also executes the skid occurring state control (step S234). The detection of the setting of the skid occurrence flag F1 at step S210 and the determination of successful or failed fulfillment of the skid convergence conditions at step S232 are similar to the processing of steps S114 and S122 in the first embodiment and are thus not specifically described here. The skid convergence state control executed at step S236 raises the maximum torque Tmax of the drive wheels 18a and 18b stepwise after every elapse of a preset standby time, limits the torque command value Tm*, which exceeds the maximum torque Tmax, to the maximum torque Tmax, specifies the settings of the target torques and the target rotation speeds of the engine 111, the motor 112, and the generator 113 corresponding to the torque command value T*, and controls the engine 111, the motor 112, and the generator 113 with the specified settings. The procedure of setting the maximum torque Tmax is similar to that executed in the skid convergence state control of the first embodiment. The procedure computes the guard value δ, reads the maximum torque Tmax corresponding to the computed guard value δ from a map similar to FIG. 6, and sets the corresponding value to the maximum torque Tmax as an initial value in the skid convergence state control. After every elapse of the preset standby time, the guard value δ is decremented by a fixed level Δδ and is updated, and the maximum torque Tmax is updated to the value corresponding to the decremented guard value δ in the map similar to FIG. 6. The skid convergence state control resets the respective flags F0 and F1 to 0 in response to the eventual decrease of the guard value δ to or below 0, before being terminated.

Figure 12:
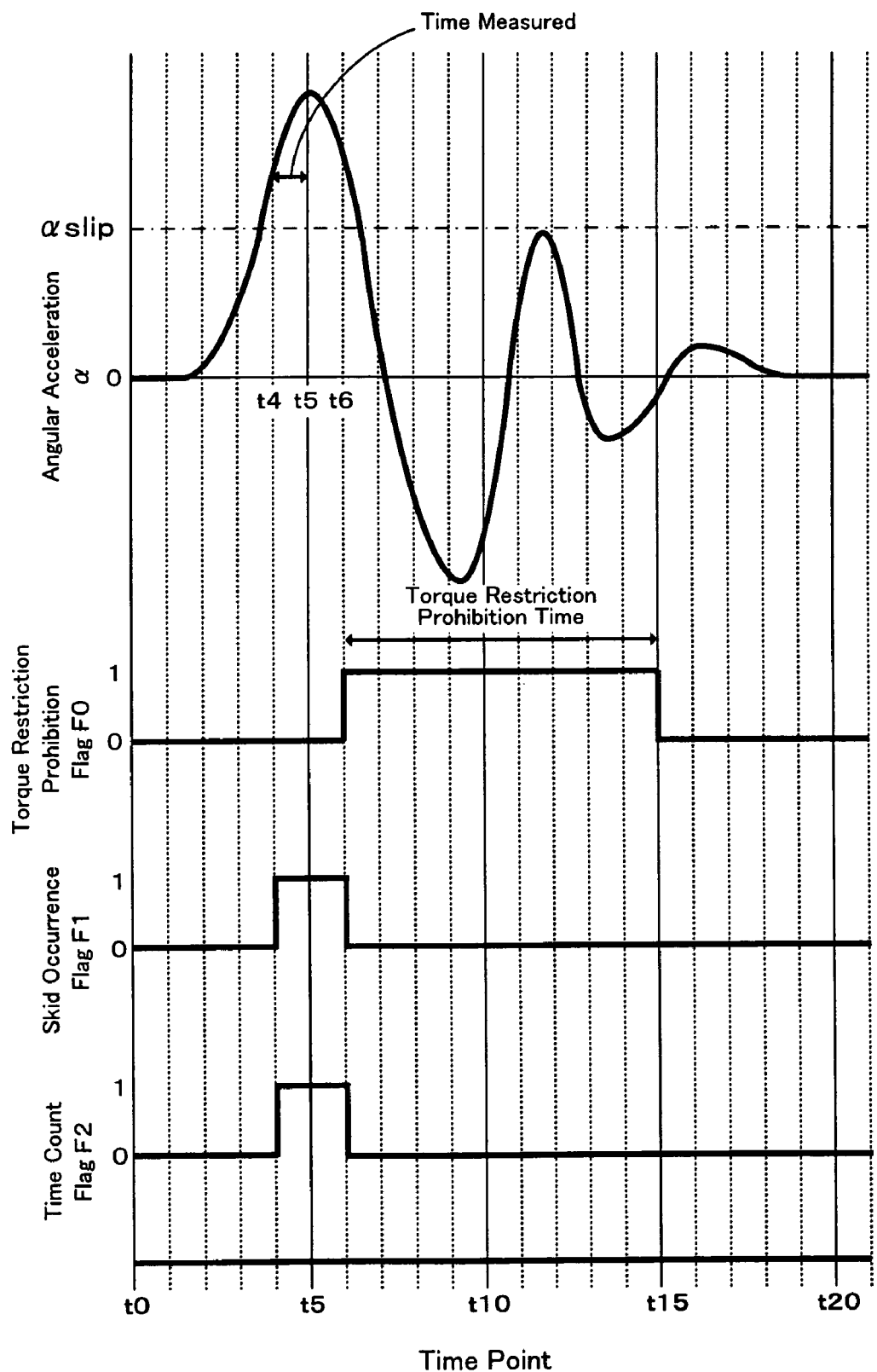
FIG. 12 shows a time variations of angular acceleration and time variations of respective flags.

FIG. 12 shows a time variation of the angular acceleration α and time variations of the respective flags. In this illustrated example, it is assumed that a time interval between a time point tn and a precedent time point tn-1 is 16 msec (when the drive control program of FIG. 10 repeated at every 8 msec is executed twice).

In the illustrated example of FIG. 12, the engine 111 starts at a time point t0 to cause some vibration of the vehicle. The time variation curve of the angular acceleration α accordingly has a temporary rise to exceed the threshold value αslip even under the condition of no occurrence of a skid. In a time period between time points t1 and t3, the grip state control is executed to output a torque corresponding to the torque command value T* to the drive shaft of the drive wheels 18a and 18b, since the angular acceleration α does not exceed the preset threshold value αslip.

At a time point t4, the angular acceleration α exceeds the preset threshold value αslip. The drive control thus sets the skid occurrence flag F1 to 1, starts the time measurement, and sets the time count flag F2 to 1. The drive control then updates the peak value αpeak to the current angular acceleration α, reads the maximum torque Tmax corresponding to the updated peak value αpeak from the map similar to FIG. 6, and limits the torque command value T* of the drive shaft linked to the drive wheels 18a and 18b, which exceeds the maximum torque Tmax, to the maximum torque Tmax.

At a time point t5, the angular acceleration α again exceeds the preset threshold value αslip. The current angular acceleration α measured at this time point is greater than the previous angular acceleration α and is thus set to the peak value αpeak. The drive control reads the maximum torque Tmax corresponding to the updated peak value αpeak from the map similar to FIG. 6, and limits the torque command value T* of the drive shaft linked to the drive wheels 18a and 18b, which exceeds the maximum torque Tmax, to the maximum torque Tmax.

At a time point t6, the angular acceleration α again exceeds the preset threshold value αslip. Since the current angular acceleration α measured at this time point is smaller than the previous angular acceleration α, the drive control fixes the previous angular acceleration α to the peak value αpeak, terminates the time measurement, and resets the time count flag F2 to 0. The drive control then specifies the cause of the increase in angular acceleration α over the preset threshold value αslip based on the result of time measurement (between the time point t4 when the angular acceleration α exceeds the preset threshold value αslip and the time point t5 when the angular acceleration α reaches its maximum in this example), that is, due to the mechanical resonance or due to the occurrence of a skid. The concrete procedure of this example simulates a time variation of the angular acceleration α due to the mechanical resonance to compute an empirical time period when the angular acceleration α increases over the threshold value αslip to reach its maximum. The procedure then sets a threshold value Tc corresponding to the empirical time period, and ascribes the increase in angular acceleration α to the mechanical resonance when the measured time does not exceed the preset threshold value Tc, while ascribing the increase in angular acceleration α to the occurrence of a skid when the measured time exceeds the preset threshold value Tc. In this illustrated example, the measured time does not exceed the preset threshold value Tc. The drive control accordingly sets the torque restriction prohibition flag F0 to 1, resets the skid occurrence flag F1 to 0, and executes the grip state control.

After a time point t7, the grip state control is executed since the torque restriction prohibition flag F0 is equal to 1. The torque restriction prohibition flag F0 is reset to 0 at a time point t15 when a predetermined restriction prohibition time has elapsed since the setting of the torque restriction prohibition flag F0 to 1.

The CPU 42 included in the electronic control unit 40 of this embodiment corresponds to the angular acceleration measurement module, the skid detection module, the torque restriction module, the state determination module, and the torque restriction prohibition module of the invention. The processing of step S206 and the processing of step S208 executed by the CPU 42 are respectively equivalent to the processing of the angular acceleration measurement module and the processing of the skid detection module. The skid occurring state control routine executed at step S234 and the skid convergence state control routine executed at step S236 are equivalent to the processing of the torque restriction module. The processing of step S228 executed by the CPU 42 is equivalent to the processing of the state determination module. The grip state control routine executed at step S212 in the setting of the value '1' to the torque restriction prohibition flag F0 is equivalent to the processing of the torque restriction prohibition module. The CPU 42 also corresponds to the engine vibration detection module, and the processing of step S228 executed by the CPU 42 is equivalent to the processing of the engine vibration detection module.

As described above, in response to detection of the occurrence of a skid based on the variation in angular acceleration α of the drive shaft linked to the drive wheels 18a and 18b, the control procedure of this embodiment limits the driving torque of the drive wheels 18a and 18b for immediate reduction of the skid. A significant variation in angular acceleration α in the vehicle driving state with no occurrence of a skid, for example, a variation in angular acceleration α that increases over the threshold value αslip and then shows a decreasing tendency in a relatively short time and is ascribed to the mechanical resonance at the start of the engine 111, may lead to misdetection of a phantom skid. Restriction of the driving torque of the drive wheels 18a and 18b is accordingly prohibited under such conditions. The control procedure of this embodiment thus effectively prevents unnecessary restriction of the driving torque in response to misdetection of a phantom skid in the angular acceleration α-based skid state determination. The control procedure of this embodiment prohibits torque restriction after the actual restriction of the driving torque. Prohibition or allowance of restriction of the driving torque is determined according to the time period when the angular acceleration α increases over the preset threshold value αslip and then shows a decreasing tendency. There is accordingly a very short time of the actual restriction of the torque restriction before its prohibition. The control procedure of this embodiment detects the occurrence of a skid when the angular acceleration α exceeds the preset threshold value αslip. This ensures easy and accurate detection of the occurrence of a skid. The restriction of the driving torque is prohibited only for the predetermined restriction prohibition time. In the event of the occurrence of a skid after elapse of the predetermined restriction prohibition time, the control procedure promptly sets the restriction of the driving torque for immediate reduction of the skid.

The embodiments discussed above are to be considered in all aspects as illustrative and not restrictive. There may be many modifications, changes, and alterations without departing from the scope or spirit of the main characteristics of the present invention.

The variation in angular acceleration α due to a large variation ΔTm of the motor torque demand Tm* (the first embodiment) and the variation in angular acceleration α due to the mechanical resonance at the start of the engine 111 (the second embodiment) are given as the examples of the significant variation in angular acceleration in the vehicle driving state with no occurrence of a skid. These examples are, however, not restrictive at all, and the vehicle may be in any driving state as long as the angular acceleration α varies with no occurrence of a skid.

The first embodiment discussed above regards the electric vehicle 10. The drive control of the first embodiment is not restricted to this electric vehicle 10 but is applicable to any vehicles equipped with a motor that directly outputs power to a drive shaft, for example, the hybrid vehicle 110 of the second embodiment and diversity of series and parallel hybrid vehicles. In application to the hybrid vehicle, the drive control may set either torque restriction of only the motor or torque restriction of both the motor and the engine to limit the torque command value T* of the drive wheels 18a and 18b.

The second embodiment discussed above regards the hybrid vehicle 110. The drive control of the second embodiment is not restricted to this hybrid vehicle 110 but is applicable to any vehicles equipped with an engine in addition to a motor that directly outputs power to a drive shaft, for example, diversity of series and parallel hybrid vehicles.

In the embodiments discussed above, the skid occurring state control and the skid convergence state control restrict the driving torque of the drive wheels 18a and 18b. Such restriction is, however, not essential and the driving torque may be restricted in any of diverse manners.

In the embodiments discussed above, one modified procedure may set a non-skid upper limit αmax, which is significantly greater than the threshold value αslip, in addition to the threshold value αslip. Even in the setting of the value '1' to the torque restriction prohibition flag F0, that is, on prohibition of torque restriction, the control procedure detects the occurrence of a skid in response to an increase in angular acceleration α over the non-skid upper limit αmax and resets the torque restriction prohibition flag F0 to 0. This arrangement prevents restriction of the driving torque of the drive wheels 18a and 18b from being wrongly prohibited in the occurrence of a skid. The non-skid upper limit αmax should be set to a value that is found only in the event of a skid.

In the embodiments discussed above, in the setting of the value '1' to the torque restriction prohibition flag F0, that is, on prohibition of torque restriction, the control procedure does not execute the skid occurring state control or the skid convergence state control with torque restriction. One modified procedure may set an unexpectedly large value to the threshold value αslip in the setting of the value '1' to the torque restriction prohibition flag F0. This arrangement keeps the angular acceleration α below the threshold value αslip and accordingly prevents determination of the skid state (at step S112 or step S208) to set the torque restriction.

INDUSTRIAL APPLICABILITY

The technique of the invention is effectively applied to vehicle-related industries including automobile industries.

The invention claimed is:

1. A vehicle skid control device of controlling a power system that outputs power to a drive shaft linked to drive wheels of a vehicle, said vehicle skid control device comprising:
   an angular acceleration measurement module that measures an angular acceleration of the drive shaft;
   a skid detection module that detects occurrence of a skid of the drive wheels according to the measured angular acceleration;
   a torque restriction module that, in response to detection of the occurrence of a skid by said skid detection module, restricts a driving torque of the drive wheels to reduce the skid;
   a torque variation detection module that determines whether a variation in torque command value of the drive wheels caused by a driver's accelerator operation is within a preset range; and
   a torque restriction prohibition module that prohibits said torque restriction module from restricting the driving torque of the drive wheels, when said torque variation detection module determines that the variation in torque command value is out of the preset range
      wherein said skid detection module detects the occurrence of a skid when the angular acceleration measured by said angular acceleration measurement module increases over a preset threshold value
   wherein said torque restriction prohibition module does not prohibit said torque restriction module from restricting the driving torque of the drive wheels, when the angular acceleration measured by said angular acceleration measurement module exceeds a non-skid upper limit, which is set to be larger than the preset threshold value.

* * * * *